(12) United States Patent
Cheng et al.

(10) Patent No.: US 8,982,470 B2
(45) Date of Patent: Mar. 17, 2015

(54) PROJECTION APPARATUS

(71) Applicants: Chuan-Te Cheng, Hsin-Chu (TW);
Tao-Hung Kuo, Hsin-Chu (TW);
Tien-Liang Hsieh, Hsin-Chu (TW)

(72) Inventors: Chuan-Te Cheng, Hsin-Chu (TW);
Tao-Hung Kuo, Hsin-Chu (TW);
Tien-Liang Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 326 days.

(21) Appl. No.: 13/681,391

(22) Filed: Nov. 19, 2012

(65) Prior Publication Data

US 2013/0271844 A1    Oct. 17, 2013

(30) Foreign Application Priority Data

Apr. 12, 2012   (CN) .......................... 2012 1 0106117

(51) Int. Cl.
*G02B 27/18*   (2006.01)
*G02B 27/10*   (2006.01)
*G02B 27/14*   (2006.01)

(52) U.S. Cl.
CPC .......... *G02B 27/1066* (2013.01); *G02B 27/143* (2013.01)
USPC ........................................................ 359/629

(58) Field of Classification Search
CPC ........................... G02B 27/1066; G02B 27/143
USPC ..................................... 359/629, 738; 353/99
See application file for complete search history.

(56) References Cited

U.S. PATENT DOCUMENTS

| | | | |
|---|---|---|---|
| 3,728,014 A * | 4/1973 | Rosenblum | ..................... 353/38 |
| 7,593,629 B2 | 9/2009 | Satori | |
| 7,789,515 B2 | 9/2010 | Hansen et al. | |
| 2005/0195223 A1 | 9/2005 | Nitta et al. | |

FOREIGN PATENT DOCUMENTS

| | | |
|---|---|---|
| CN | 101655606 | 2/2010 |
| JP | 2001188111 | 7/2001 |
| JP | 2011203443 | 10/2011 |
| TW | 200535547 | 11/2005 |
| TW | 201028786 | 8/2010 |
| WO | 2004084534 | 9/2004 |

OTHER PUBLICATIONS

"Office Action of China Counterpart Application", issued on Nov. 4, 2014, p. 1-p. 7.

* cited by examiner

*Primary Examiner* — Joseph P Martinez
(74) *Attorney, Agent, or Firm* — Jianq Chyun IP Office

(57) ABSTRACT

A projection apparatus including an image source, an imaging module and a beam splitting module is provided. The image source provides an image beam. The imaging module is disposed on a transmission path of the image beam and has an aperture stop. The beam splitting module is disposed on the transmission path of the image beam and located on or near the aperture stop. The beam splitting module includes a plurality of aperture stop sub-regions, and the beam splitting module separates a plurality of image sub-beams of the image beam irradiating these different aperture stop sub-regions. These image sub-beams respectively propagate towards different directions after travelling to these aperture stop sub-regions.

18 Claims, 12 Drawing Sheets

PROJECTION APPARATUS

CROSS-REFERENCE TO RELATED APPLICATION

This application claims the priority benefit of China application serial no. 201210106117.9, filed on Apr. 12, 2012. The entirety of the above-mentioned patent application is hereby incorporated by reference herein and made a part of this specification.

BACKGROUND OF THE INVENTION

1. Field of the Invention

The invention relates to a display apparatus, and more particularly, to a projection apparatus.

2. Description of Related Art

With the progress in science and technology, a variety of displays applying different display principles has been constantly brought forth the new to replace the old ones, for example, to evolve from a conventional cathode ray tube (CRT) to a liquid crystal display, a plasma display, an organic light-emitting diode (OLED) display, a projection apparatus and so on.

Although a variety of displays have been constantly brought forth the new to replace the old ones, projection apparatuses are always able to maintain an indispensable role in the displays. This is because the projection apparatus is with small size/volume to produce large image frames as well as the conventional display device of which the size/volume is many times larger than the projection apparatus generates. And the projection apparatus is to spend relatively low costs to produce large image frames. In contrast, the device sizes of liquid crystal displays, plasma displays, organic light-emitting diode displays, etc., are usually slightly larger than the sizes of image frames produced by these displays, thus rapidly increasing the costs and falling short of delivering economic efficiency. Such large displays occupy relatively large space, which are not facilitated for the utilization of indoor space.

In order to produce a blending image frame with mega-size, for example, when a very large image frame is produced by blending M×N image frames together, the known techniques is utilized M×N projection apparatuses to respectively project the M×N image frames. However, utilizing M×N projection apparatuses indicates that the volume of devices becomes more than M×N times and the cost also becomes at least M×N times.

U.S. Pat. No. 7,593,629 discloses that an optical system comprises a first lens group, a second lens group, an aperture, a reflective mirror, a third lens group, a fourth lens group, and a fifth lens group using to producing images with appropriate size. In addition, Taiwan Patent Publication No. 200535547 discloses that a projection system comprises a light source, a displaying unit, a projection unit, a screen, and a driving unit.

SUMMARY OF THE INVENTION

The invention is directed to a projection apparatus which produces a blending image frame with low costs.

The invention provides a projection apparatus, and the projection apparatus is utilized for display apparatuses on the store shelves, for example, a shelf display, which may display the information of product price, quantity or product name.

Other objects and advantages of the invention may be further comprehended by reading the technical features described in the invention as follows.

In order to achieve one of, a part of or all of the above-mentioned objects, or to achieve other objects, an embodiment of the invention provides a projection apparatus, and the projection apparatus includes an image source, an imaging module, and a beam splitting module. The image source provides an image beam. The imaging module is disposed on a transmission path of the image beam and has an aperture stop. The beam splitting module is disposed on the transmission path of the image beam and located on or near the aperture stop. The beam splitting module includes a plurality of aperture stop sub-regions, and the beam splitting module separates a plurality of image sub-beams of the image beam respectively irradiating these different aperture stop sub-regions. These image sub-beams respectively propagate towards different directions after travelling to these aperture stop sub-regions.

The projection apparatus of the embodiments of the invention may achieve at least one of the following advantages: in the projection apparatus of the embodiments of the invention, the beam splitting module is disposed on or near the aperture stop, and the aperture stop sub-regions separate the image sub-beams irradiating thereon. Therefore, these image sub-beams may be projected on different locations of an imaging surface to form a plurality of frames. Consequently, a projection apparatus may be utilized to produce a blending frame composed of the plurality of frames. Hence, the projection apparatus of the embodiments of the invention may produce blending image frames with low costs.

Other objectives, features and advantages of the invention will be further understood from the further technological features disclosed by the embodiments of the invention, wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
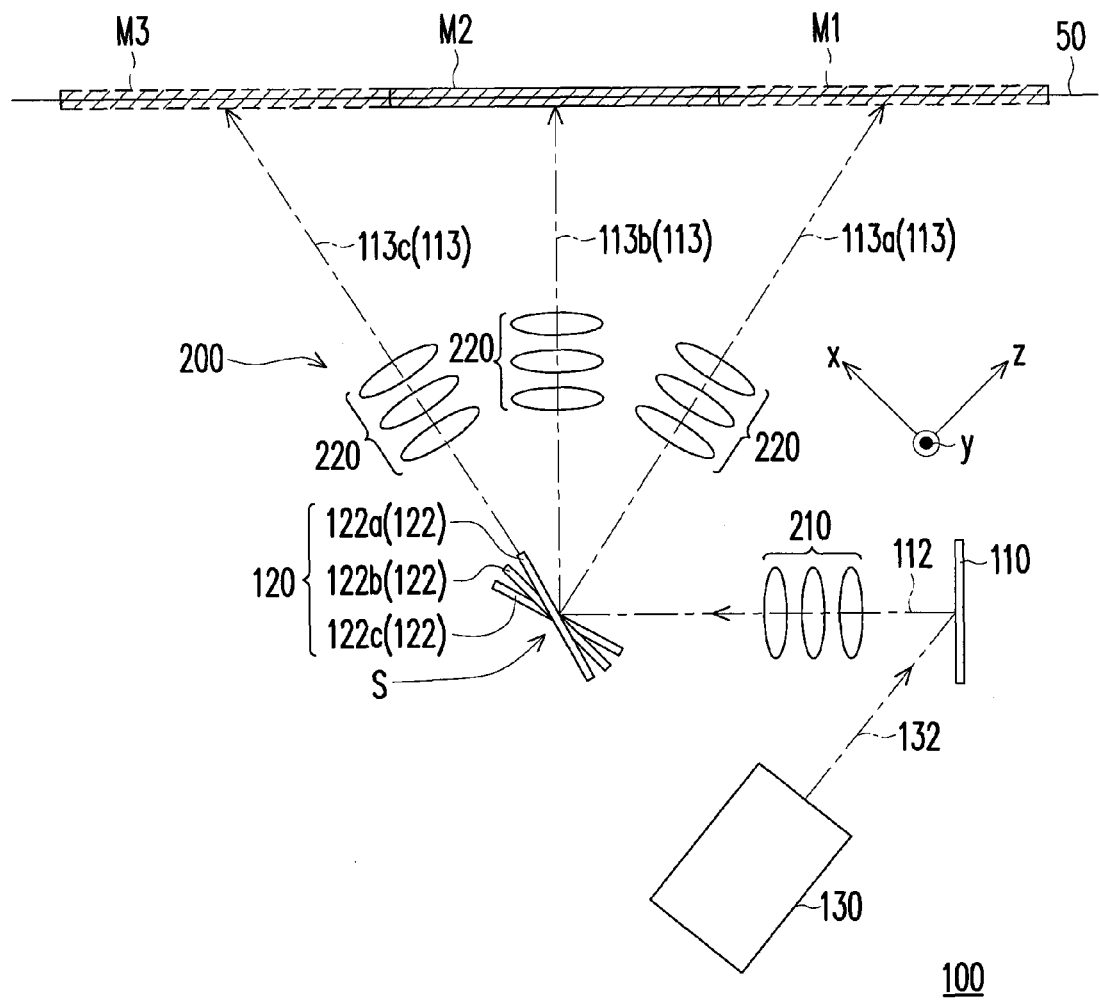
FIG. 1A is a top view of a projection apparatus according to an embodiment of the invention.
Figure 1B:
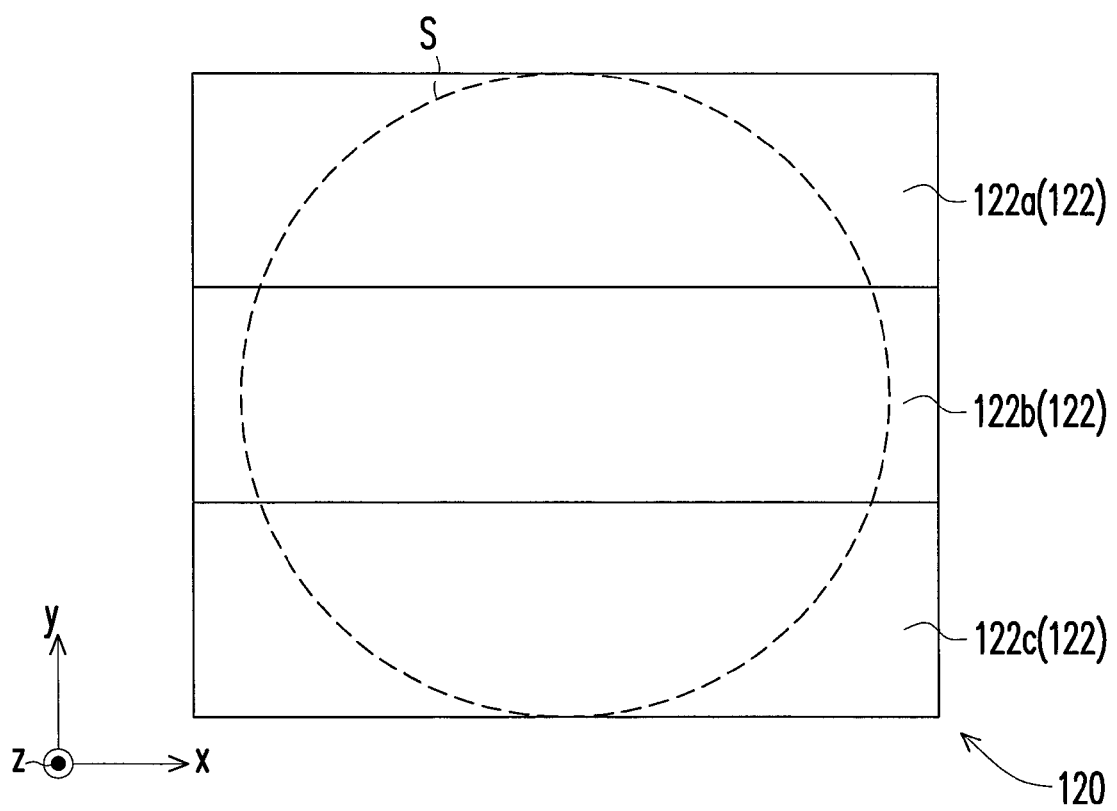
FIG. 1B is a front view of a beam splitting module in FIG. 1A.
Figure 1C:
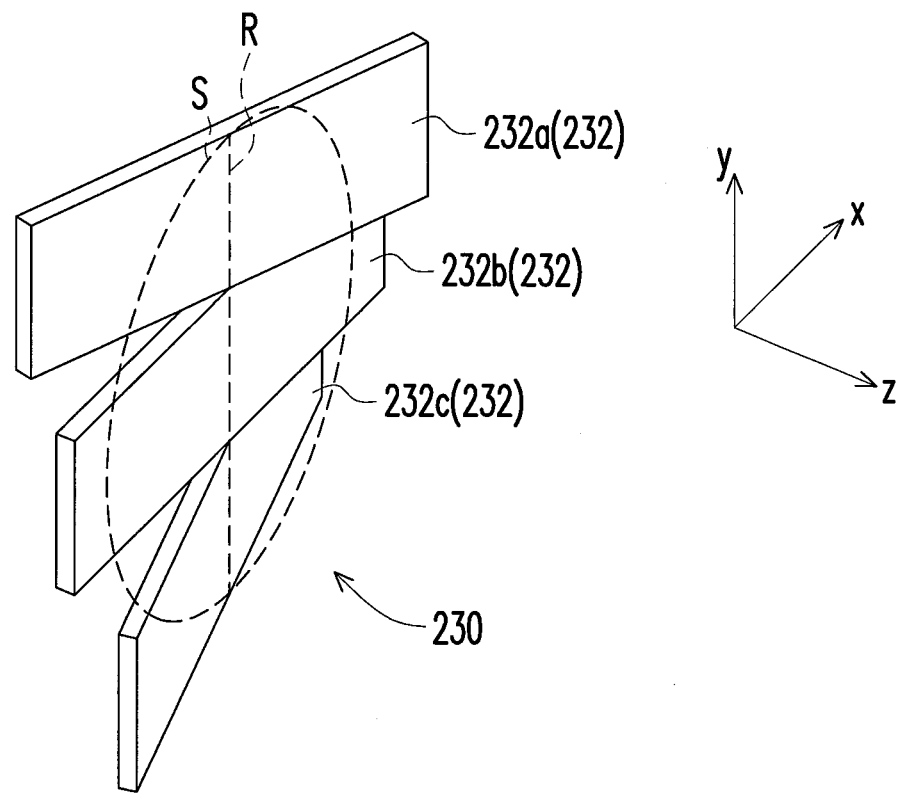
FIG. 1C is a three-dimensional view of the beam splitting module of FIG. 1B.
Figure 2:
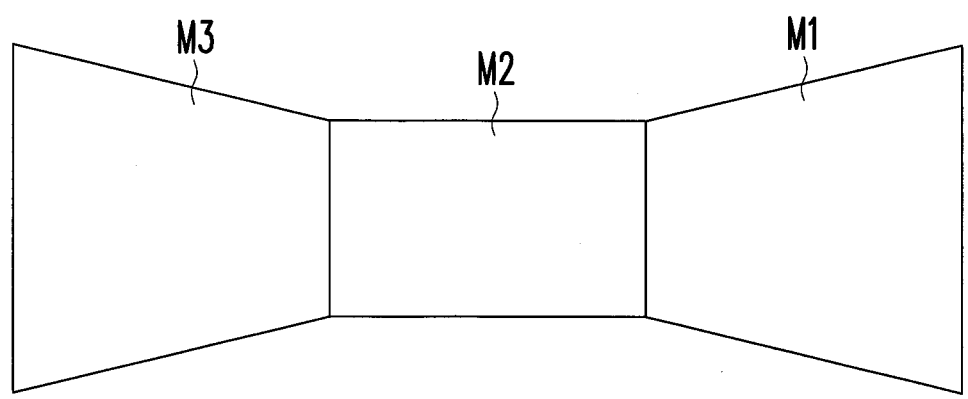
FIG. 2 is a schematic view of an image produced by the projection apparatus of FIG. 1A.

FIG. 1A is a top view of a projection apparatus according to an embodiment of the invention, FIG. 1B is a front view of a beam splitting module in FIG. 1A, FIG. 1C is a three-dimensional view of the beam splitting module of FIG. 1B, and FIG. 2 is a schematic view of an image produced by the projection apparatus of FIG. 1A. Referring to FIG. 1A to FIG. 1C and FIG. 2, a projection apparatus 100 of the embodiment includes an image source 110, an imaging module 200, and a beam splitting module 120. The image source 110 provides an image beam 112. In the embodiment, the projection apparatus 100 further includes an illumination system 130, and the illumination system 130 is utilized to provide an illumination beam 132. The image source 110 is, for example, a light valve disposed on a transmission path of the illumination beam 132 in order to convert the illumination beam 132 into the image beam 112. In the embodiment, the light valve is, for example, a digital micro-mirror device (DMD), a liquid-crystal-on-silicon panel (LCOS panel), a transmissive liquid crystal panel or other appropriate spatial light modulators. However, in other embodiments, the image source 110 may also be a self-illumination display, and the image source 110 is able to emit the image beam 112. This type of self-illumination display is, for example, a light emitting diode array display, an organic light emitting diode array display, a field emission display, a plasma display panel or other appropriate self-illumination displays.

The imaging module 200 is disposed on a transmission path of the image beam 112, and has an aperture stop S. The aperture stop S, namely, is an aperture of the imaging module 200. The beam splitting module 120 is disposed on the path of the image beam 112 and located on or near the aperture stop S. In the embodiment, the beam splitting module 120 is taken locating on the aperture stop S as an example. The beam splitting module 120 includes a plurality of aperture stop sub-regions 122 (exemplified with the aperture stop sub-regions 122a, 122b, and 122c in FIG. 1A to FIG. 1C), and the beam splitting module 120 enables a plurality of image sub-beams 113 (exemplified with the image sub-beams 113a, 113b, and 113c in FIG. 1A) of the image beam 112 irradiating these different aperture stop sub-regions 122, to separate. After travelling to these aperture stop sub-regions 122, these image sub-beams 113a, 113b, and 113c respectively propagate towards different directions. More specifically, after travelling to the aperture stop sub-region 122a, the image sub-beam 113a is projected onto an imaging surface 50 to form an image M1. After travelling to the aperture stop sub-region 122b, the image sub-beam 113b is projected onto the imaging surface 50 to form an image M2. After travelling to the aperture stop sub-region 122c, the image sub-beam 113c is projected onto the imaging surface 50 to form an image M3.

In the embodiment, the imaging module 200 includes a rear lens group 210 and a plurality of front lens groups 220. The rear lens group 210 is disposed on a transmission path of the image beam 112 and located between the image source 110 and the aperture stop S. These front lens groups 220 are respectively disposed on the transmission paths of these image sub-beams 113 (such as image sub-beams 113a, 113b, and 113c).

In the embodiment, these aperture stop sub-regions 122 (namely, aperture stop sub-regions 122a, 122b, and 122c) are respectively formed by a plurality of first reflectors (namely, components are also labelled by numerals 122a, 122b, and 122c), and these first reflectors respectively reflect these image sub-beams 113 in different directions. In the embodiment, these aperture stop sub-regions 122a, 122b, and 122c are arranged along a reference line R. More specifically, the three-dimensional space where the beam splitting module 120 is may be defined by a Cartesian coordinate constructed by an x-axis, a y-axis, and a z-axis perpendicular to each other, wherein the z-axis is perpendicular to the first reflector forming the aperture stop sub-region 122b, the y-axis is parallel to the reference line R, while the x-axis is parallel to the first reflector, forming the aperture stop sub-region 122b, and perpendicular to the y-axis and the z-axis. In addition, the orientation of the first reflector forming the aperture stop sub-region 122a is the same as the orientation rotating around the reference line R clockwisely from the orientation of the first reflector forming the aperture stop sub-region 122b, and the orientation of the first reflector forming the aperture stop sub-region 122c is the same as the orientation rotating the reference line R counterclockwisely from the orientation of the first reflector forming the aperture stop sub-region 122b. Since the orientations of the aperture stop sub-regions 122a, 122b and 122c are different, the image sub-beams 113a, 113b and 113c are able to propagate in different directions.

In the embodiment, the projection apparatus 100 further includes a screen disposed on the imaging surface 50 (the line indicating the imaging surface 50 represents the location of the screen), and the imaging module 200 projects these image sub-beams 113a, 113,b and 113c on different regions of the imaging surface 50, for example, the image sub-beams 113a, 113b, and 113c are respectively projected on the region where the image M1 locates, the region where the image M2 locates, and the region where the image M3 locates. These image sub-beams 113a, 113b and 113c respectively form a plurality of images M1, M2 and M3 on the imaging surface 50, and these images M1, M2 and M3 are adjacent to one other. In the embodiment, these images M1, M2, and M3 are connected with one other, so as to form a blending image frame, as illustrated in FIG. 2.

In the projection apparatus 100 of the embodiment, the beam splitting module 120 is disposed on or near the aperture stop S, and the aperture stop sub-regions 122 separate the image sub-beams 113 illuminating thereon. Therefore, these image sub-beams 113 are able to be projected on different locations of the imaging surface 50 to form a plurality of frames (such as images M1, M2, and M3). Consequently, it is able to produce a blending frame composed of a plurality of frames by the projection apparatus 100. Therefore, the projection apparatus 100 of the embodiment may reduce the costs of producing blending image frames. Namely, the projection apparatus 100 of the embodiment may be with fewer amounts of devices and smaller system volume to produce blending image frames.

In addition, in the embodiment, since the beam splitting module 120 is disposed on or near the aperture stop S, a chief ray of a beam emitted from each field of the image source 110 passes through the center of the aperture stop S (that is, the intersection of the optical axis of the rear lens group 210 and the aperture stop S), while a marginal ray of a beam emitted from each field of the image source 110 passes through the edge of the aperture stop S. In other words, all of the beams emitted from each of the fields are to fill up the entire aperture stop S. Therefore, after the aperture stop S is divided into the plurality of aperture stop sub-regions 122, the image sub-beams 113 travelling to each of the aperture stop sub-regions 122 are still able to carry the image information of the entire image source 110, and thus the images M1, M2, and M3 are all able to present the image of the entire image source 110 individually. When the image of the image source 110 is divided into several parts, the brightness of each of the images M1, M2, and M3 is lower than the one that the aperture stop S is not divided, and the imaging module forms only one image. Since these images M1, M2 and M3 are all from the same image source 110, the color saturation difference of these images M1, M2 and M3 is less than the color saturation difference among a plurality of images formed by utilizing a plurality of different image sources (such as utilizing a plurality of different projectors). Thus, it is easy to calibrate the color of the projection apparatus 100 of the embodiment. Here, the definition of "near" from "the beam splitting module 120 is disposed near the aperture stop S", is when the beam splitting module 120 is at this location, all of each individual content of the images M1, M2 and M3 are substantially capable of originating from the content shown by the image source 110 and hardly losing a partial content shown by the image source.

Figure 3A:
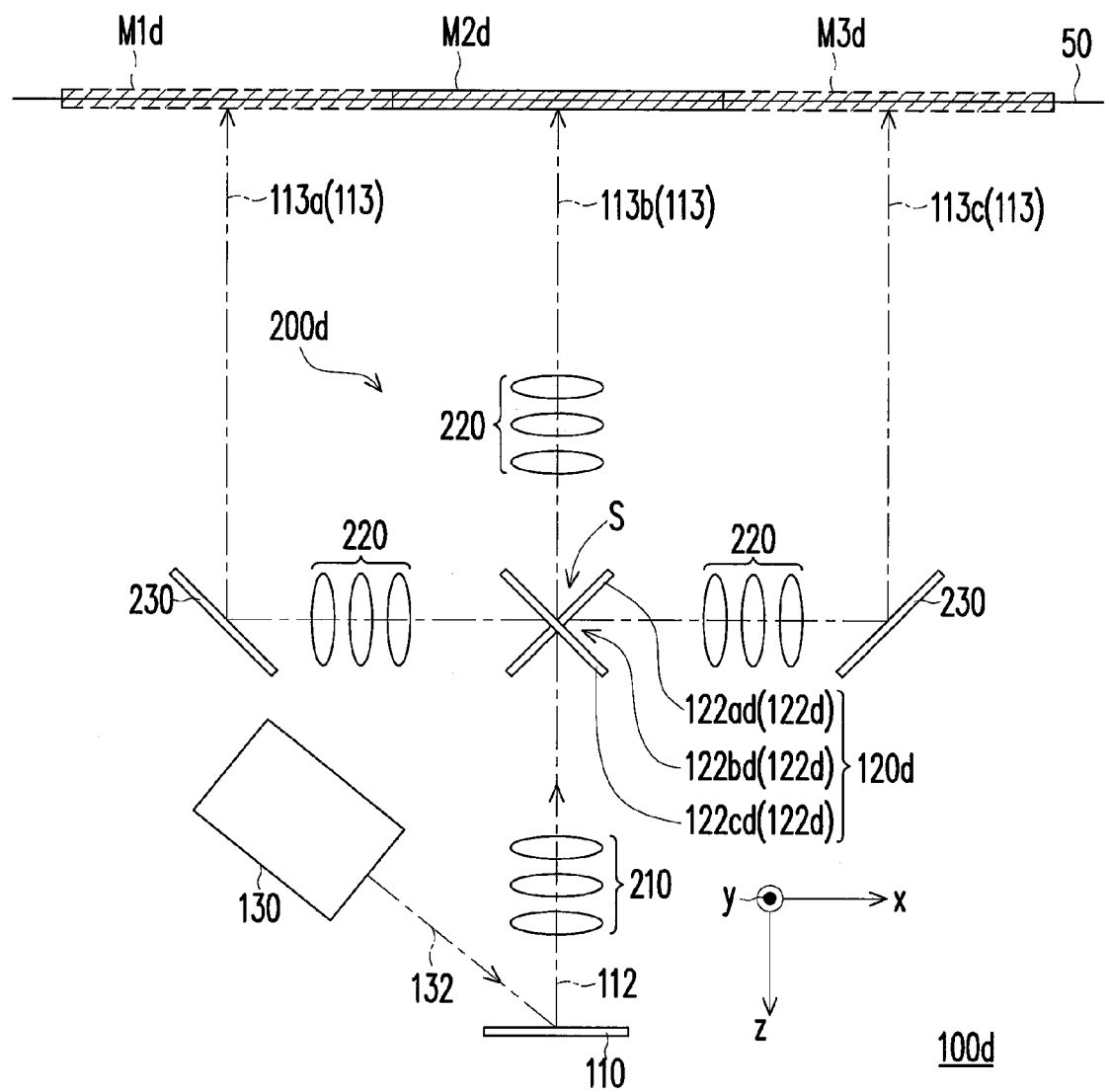
FIG. 3A is a top view of a projection apparatus according to another embodiment of the invention.
Figure 3B:
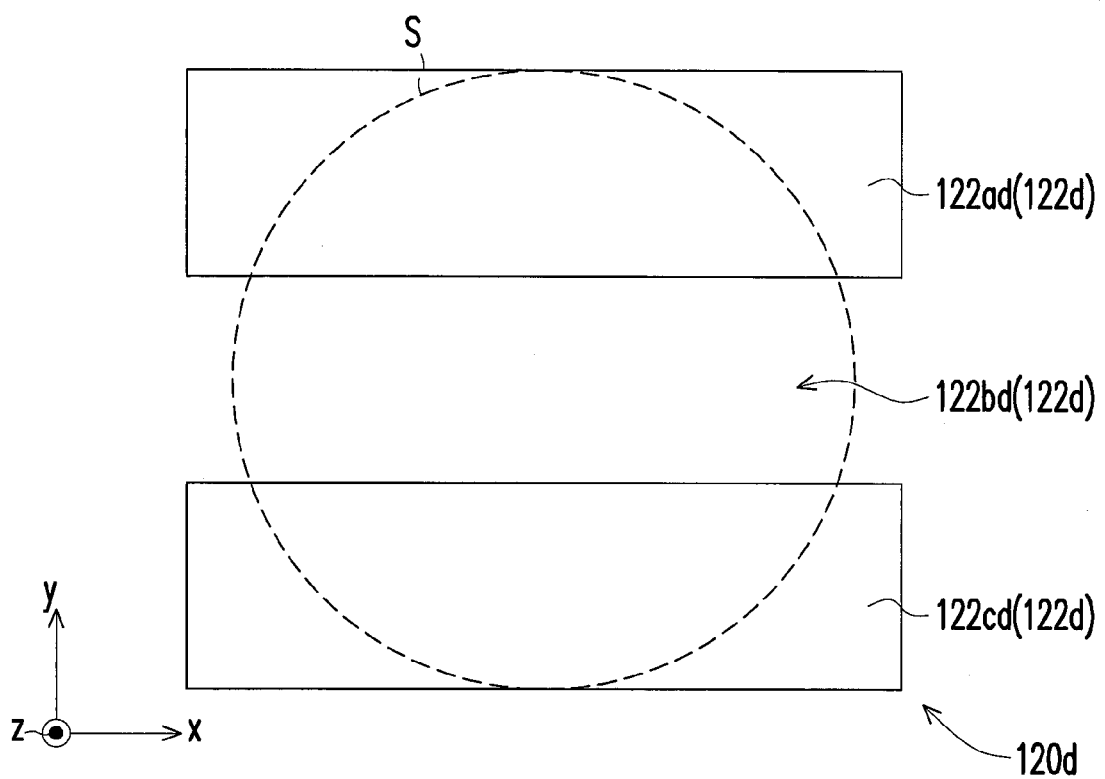
FIG. 3B is a front view of a beam splitting module in FIG. 3A.
Figure 3C:
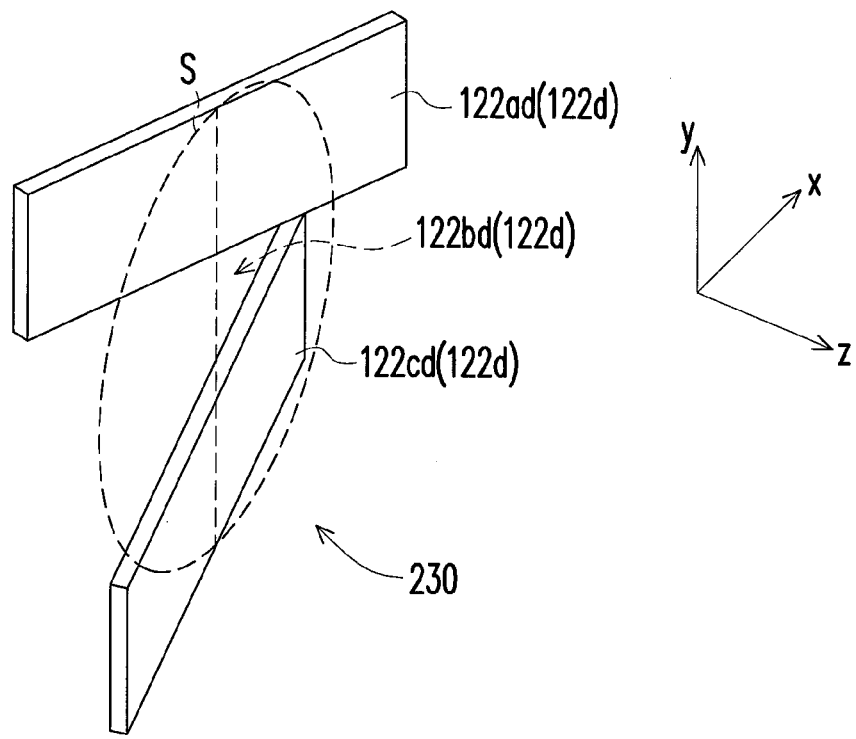
FIG. 3C is a three-dimensional view of the beam splitting module of FIG. 3B.
Figure 4:
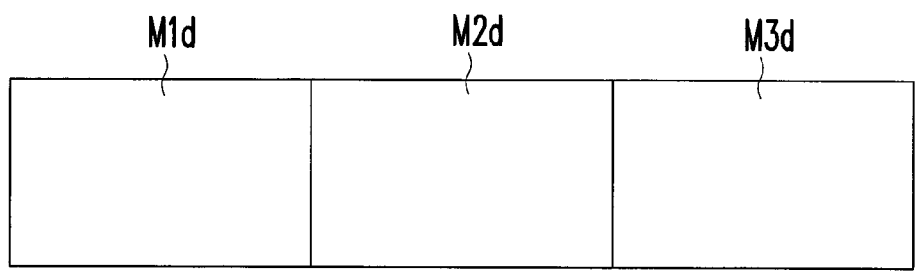
FIG. 4 is a schematic view of an image produced by the projection apparatus of FIG. 3A.

FIG. 3A is a top view of a projection apparatus according to another embodiment of the invention, FIG. 3B is a front view of a beam splitting module in FIG. 3A, FIG. 3C is a three-dimensional view of the beam splitting module of FIG. 3B, and FIG. 4 is a schematic view of an image produced by the projection apparatus of FIG. 3A. The projection apparatus 100d of the embodiment is similar to the projection apparatus 100 of FIG. 1A, and the difference between the two is described as follows. In the projection apparatus 100d of the embodiment, one of these aperture stop sub-regions 122d is a light transmissive region (for example, an aperture stop sub-region 122bd is the light transmissive region), while the other aperture stop sub-regions 122d are reflective regions (for example, aperture stop sub-regions 122ad and 122cd are the reflective regions), and these image sub-beams 113 respectively propagate in different directions after travelling to the light transmissive region and the reflective regions. In other words, after the first reflector forming the aperture stop sub-region 122b in the beam splitting module 120 of FIG. 1C is removed, the light transmissive region of the embodiment may be produced (that is, the aperture stop sub-region 122bd). In the embodiment, these reflective regions are respectively formed by a plurality of first reflectors. However, in other embodiments, when the aperture stop S is divided into a reflective region and a light transmissive region, the amount of first reflectors may be one, and the first reflector forms the reflective region. In the embodiment, the image sub-beam 113b passes through the aperture stop sub-region 122bd after travelling to the aperture stop sub-region 122bd (that is, the light transmissive region), and then is projected on an imaging surface 50 by a front lens group 220 located in the center of FIG. 3A to form an image M2d. Furthermore, the image sub-beams 113a and 113c are respectively reflected by the first reflectors forming the aperture stop sub-regions 122ad and 122cd after travelling to the aperture stop sub-regions 122ad and 122cd, and then are projected on the imaging surface 50 by front lens groups 220 located at the two side of FIG. 3A to respectively form an image M1d and an image M3d.

In addition, in the embodiment, the region (that is, the region of the image M2d) of the imaging surface 50 where the image sub-beam 113b passing through the light transmissive region (such as the aperture stop sub-region 122bd) travels, is different from the regions (that is, the regions of the images M1d and M3d) of the imaging surface 50 where the image sub-beams 113a and 113c reflected by the reflective regions (such as the aperture stop sub-regions 122ad and 122cd) travel.

Furthermore, in the embodiment, the imaging module 200d further includes at least one second reflector 230 (exemplified with two second reflectors 230 in FIG. 3A), which are disposed on transmission paths of the image sub-beams 113 (such as the image sub-beams 113a and 113c) reflected by the reflective regions (such as the aperture stop sub-regions 122ad and 122cd), so as to reflect the image sub-beams 113a and 113c reflected by the reflective regions to the regions of the images M1d and M3d.

In the projection apparatus 100 of FIG. 1A, the image sub-beam 113a and the image sub-beam 113c are obliquely incident upon the imaging surface 50, and therefore, the situation of keystone distortion occurs in the image M1 and the image M3. However, in the embodiment, since the design of the light transmissive region collocating with the second reflectors 230 is employed, the image sub-beams 113a, 113b, and 113c may all be substantially perpendicularly incident upon the imaging surface 50, so that all the images M1d, M2d, and M3d may substantially not have the keystone distortion.

In addition, since the light transmissive region may not employ reflectors, the projection apparatus 100 of the embodiment may cut down on the use quantity of reflectors for reducing the light loss. Moreover, in the embodiment, the light paths of the image sub-beams 113a, 113c are longer than the light path of the image sub-beam 113b, and therefore, the throw ratios of the front lens groups 220 disposed on the light paths of the image sub-beams 113a and 113c may be different from the throw ratio of the front lens group 220 disposed on the light path of the image sub-beam 113b. With appropriately throw ratios of these front lens groups 220, the sizes of the images M1d, M2d, and M3d may be substantially the same.

Figure 5A:
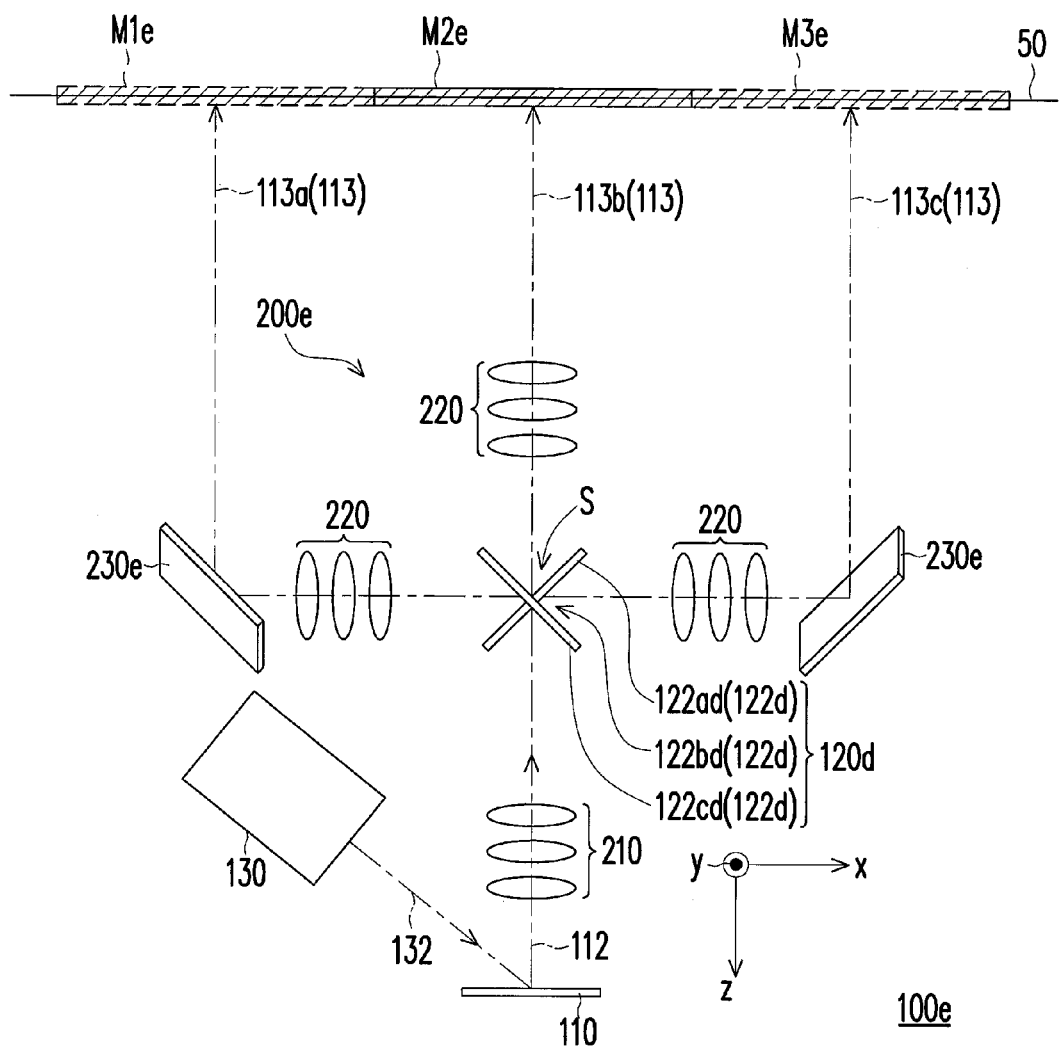
FIG. 5A is a front view of a projection apparatus according to still another embodiment of the invention.
Figure 5B:
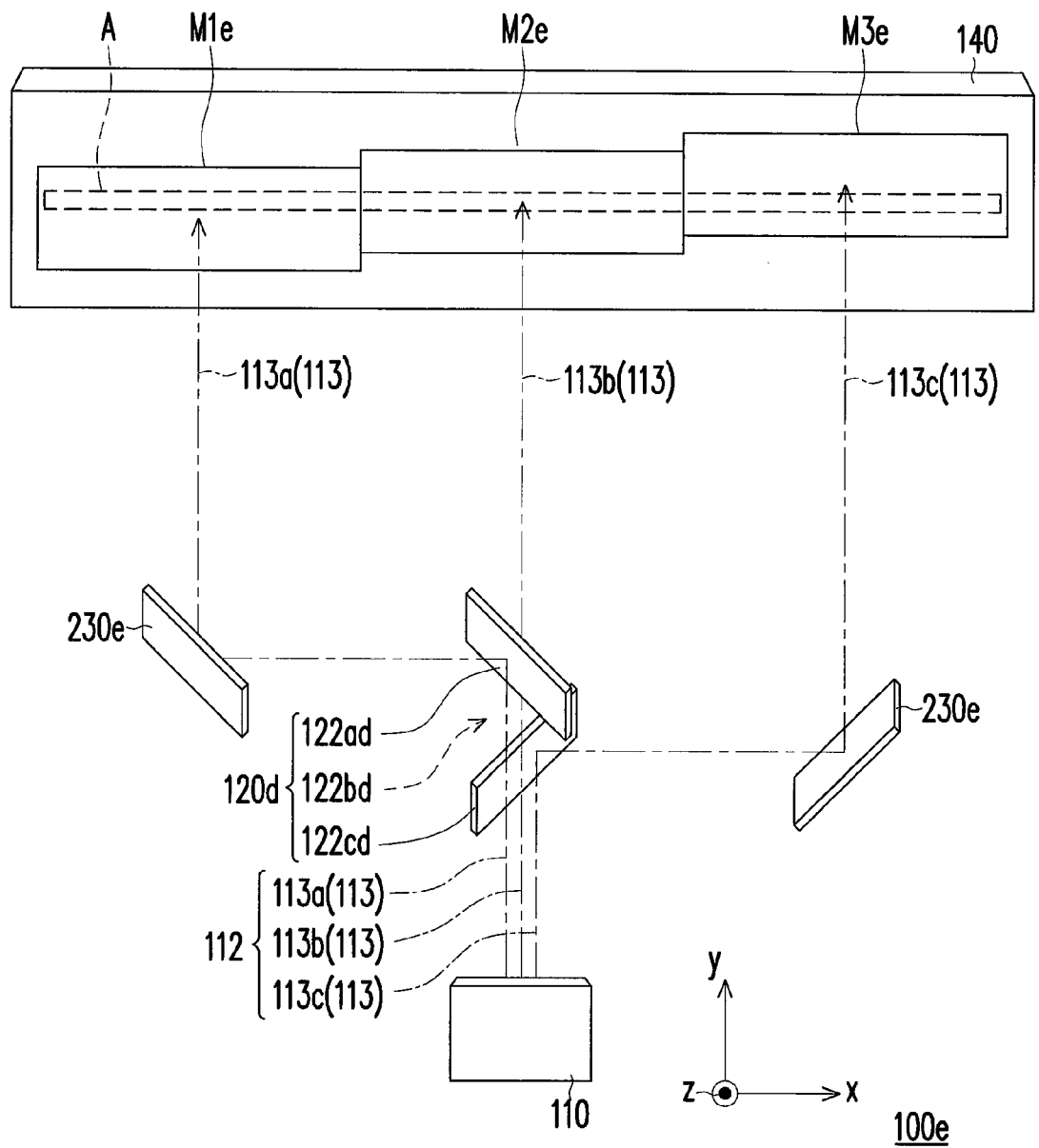
FIG. 5B is a schematic three-dimensional view of the projection apparatus of FIG. 5A.
Figure 6A:
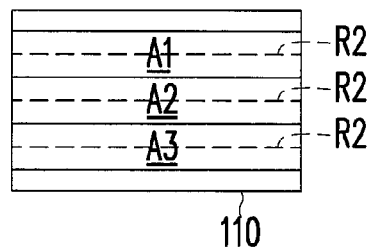
FIG. 6A illustrates a second content shown by an image source in FIG. 5A.
Figure 6B:
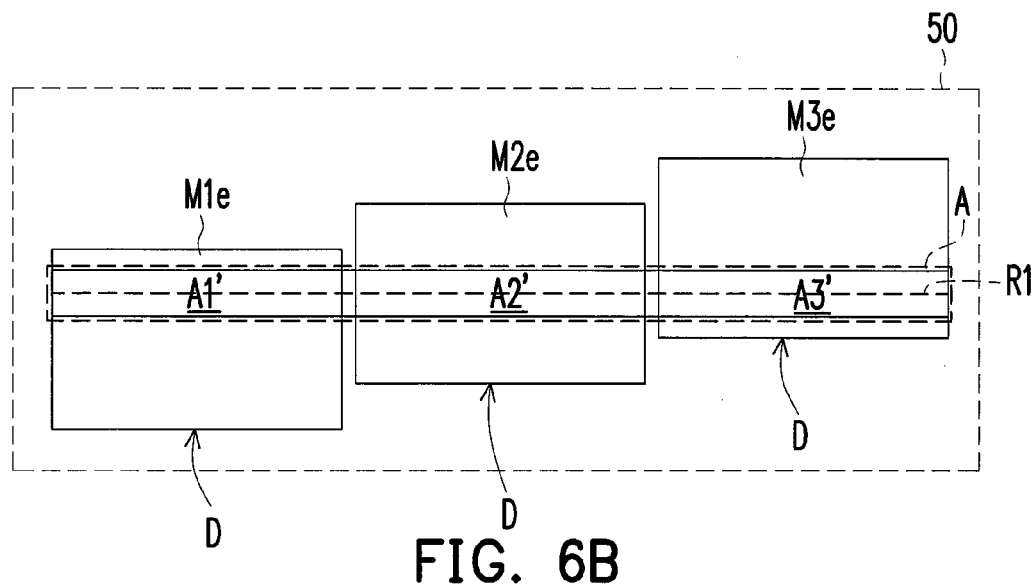
FIG. 6B illustrates first contents of images in FIG. 5B.

FIG. 5A is a front view of a projection apparatus according to still another embodiment of the invention, FIG. 5B is a schematic three-dimensional view of the projection apparatus of FIG. 5A, FIG. 6A illustrates a second content shown by an image source in FIG. 5A, and FIG. 6B illustrates first contents of the images M1e, M2e and M3e in FIG. 5B, wherein for readers to visualize the three-dimensional location relationship of some elements in the space conveniently, the illumination system, the front lens groups and the rear lens group are omitted in FIG. 5B. Referring to FIG. 5A to FIG. 5B and FIG. 6A to FIG. 6B, the projection apparatus 100e of the embodiment is similar to the projection apparatus 100d of FIG. 3A, and the difference between the two is described as follows. In the projection apparatus 100e of the embodiment, it could produce the misalignment efficiency of the images M1e, M2e, and M3e in the vertical direction (that is, the y-direction) through adjusting the orientations of second reflectors 230e appropriately. For example, the second reflector 230 on the left-hand side of FIG. 3A rotates towards to the figure, that is, may form the second reflector 230e on the left-hand side of FIG. 5A, and the second reflector 230 on the right-hand side of FIG. 3A rotates away from the figure, that is, may form the second reflector 230e on the right-hand side of FIG. 5A. More specifically, in the projection apparatus 100e of the embodiment, each of the images M1e, M2e, and M3e has an edge D. These images M1e, M2e, and M3e respectively have a plurality of first contents A1', A2' and A3' on a first reference line R1 substantially parallel to these edges D, and these first contents A1', A2' and A3' respectively are from a plurality of second contents A1, A2 and A3 on a plurality of second reference lines R2 of the image source 110. In the embodiment, these second reference lines R2 are substantially parallel to one other but do not coincide with one other. In addition, the first reference line R1, for example, is parallel to the horizontal direction of the images M1e, M2e and M3e, and the second reference lines R2 are parallel to the horizontal direction of the image source 110. In other words, the second contents A1, A2 and A3 originally arranged in the vertical direction form the first contents A1', A2' and A3' arranged in the horizontal direction on a screen 140, after passing through the beam splitting module 120d and the imaging module 200e. In the embodiment, regions A of the screen 140 corresponding to the first contents A1', A2' and A3' may be light scattering regions or light diffusion regions, and regions other than the regions A of the screen may be light shielding regions or light absorbing regions, hence, a user is able to see the first contents A1', A2' and A3' located in the regions A, but not able to see the contents other than the regions A. Therefore, the images M1e, M2e and M3e may respectively form different image frames and blend into a blending frame. Perhaps, in another embodiment, the screen also may only be set in the regions A, namely, the parts of these images M1e, M2e, and M3e on the screen (that is, the first contents A1', A2', and A3') respectively are from the different regions of the image source (that is, respectively from the regions of the second contents A1, A2, and A3). In this way, the user is also able to see the blending frame in the regions A. In the embodiment, the projection apparatus 100e utilizing for display apparatuses on the store shelves that may display the information of product price, quantity or product name, etc., is, for example, a shelf display, namely, the projection apparatus 100e is employed the principle of rear projection, wherein the screen 140 is located between the user and the image source 110, and the regions A of the screen 140 may be the transparent scattering regions.

In the embodiment, the image sub-beam 113b is to pass through the aperture stop sub-region 122bd but is not reflected by a reflector. Additionally, the reflective mirrors 230e are employed the tilting disposition manner for the images M1e, M2e and M3e to produce the effect of misalignment, and therefore, the thickness of the projection apparatus 100e on the y-direction may be reduced to reduce the overall volume of the projection apparatus 100e.

Figure 7:
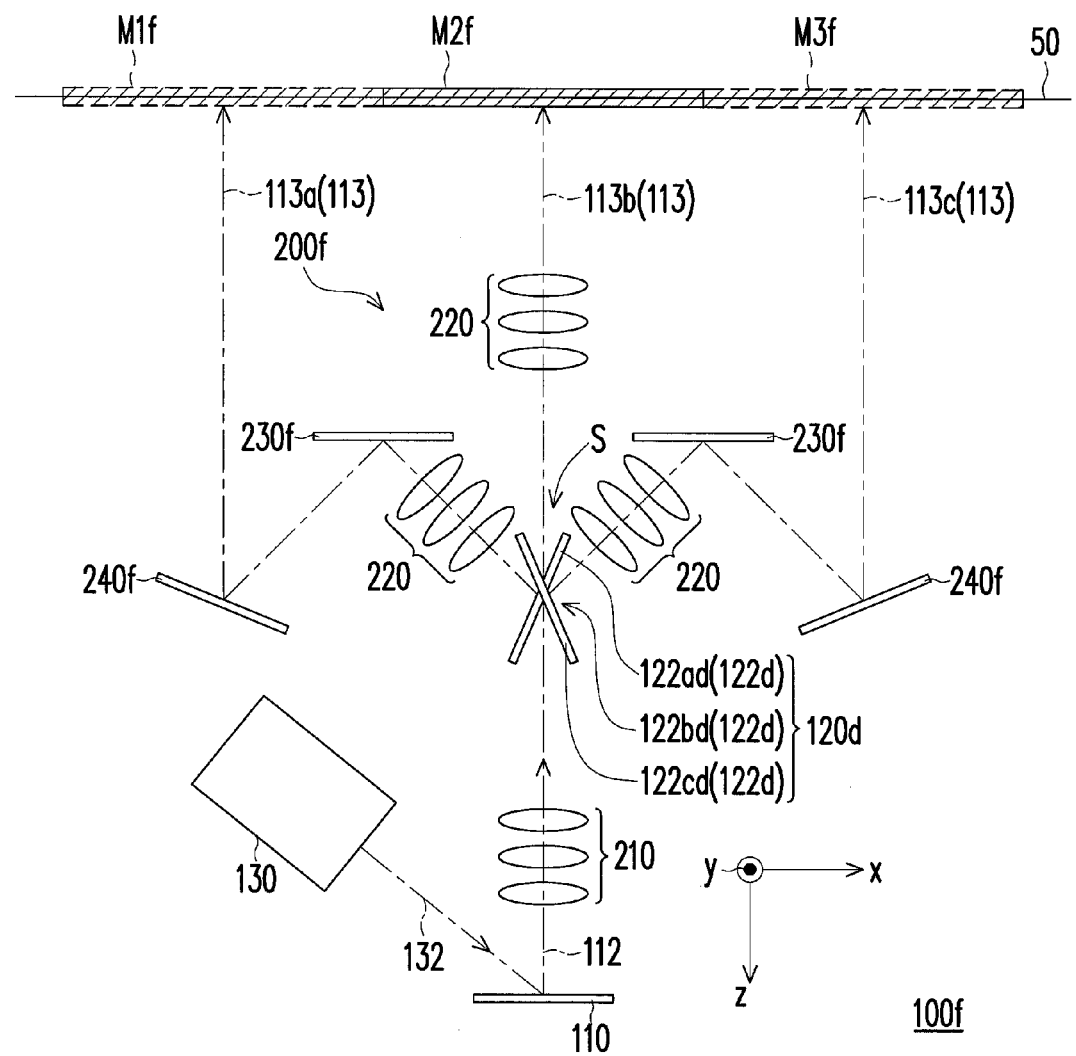
FIG. 7 is a top view of a projection apparatus according to yet another embodiment of the invention.

FIG. 7 is a top view of a projection apparatus according to yet another embodiment of the invention. Referring to FIG. 7, the projection apparatus 100f of the embodiment is similar to the projection apparatus 100e of FIG. 5A, and the difference between the two is described as follows. In the embodiment, the imaging module 200f further includes at least one third reflector 240f (exemplified with two third reflectors 240f in FIG. 7), which are disposed on transmission paths of the image sub-beams 113a, 113c reflected by the second reflectors 230f, so as to reflect the image sub-beams 113a, 113c reflected by the second reflectors 230f to the regions of the images M1f and M3f. In the embodiment, the second reflectors 230f respectively reflect the image sub-beams 113a and 113c from the beam splitting module 120d to the third reflectors 240f.

Since the projection apparatus 100f of the embodiment is simultaneously employed the second reflectors 230f and the third reflectors 240f to form the misaligned images M1f and M3f on the vertical direction, the degree of freedom of the second reflectors 230f and the third reflectors 240f may be greater during reflecting the image sub-beams 113a and 113c. In this way, the images M1f and M3f may both be the horizontally well-balanced images through the appropriate tilting of the second reflectors 230f and the third reflectors 240f (such as rotate towards to the figure to tilt, or rotate away from the figure to tilt), and unlikely to skew. Furthermore, since the degree of freedom of the second reflectors 230f and the third reflectors 240f are greater, the positions of the second reflectors 230f and the third reflectors 240f on the y-direction may still be limited for reducing the thickness of the projection apparatus 100f on the y-direction.

Figure 8:
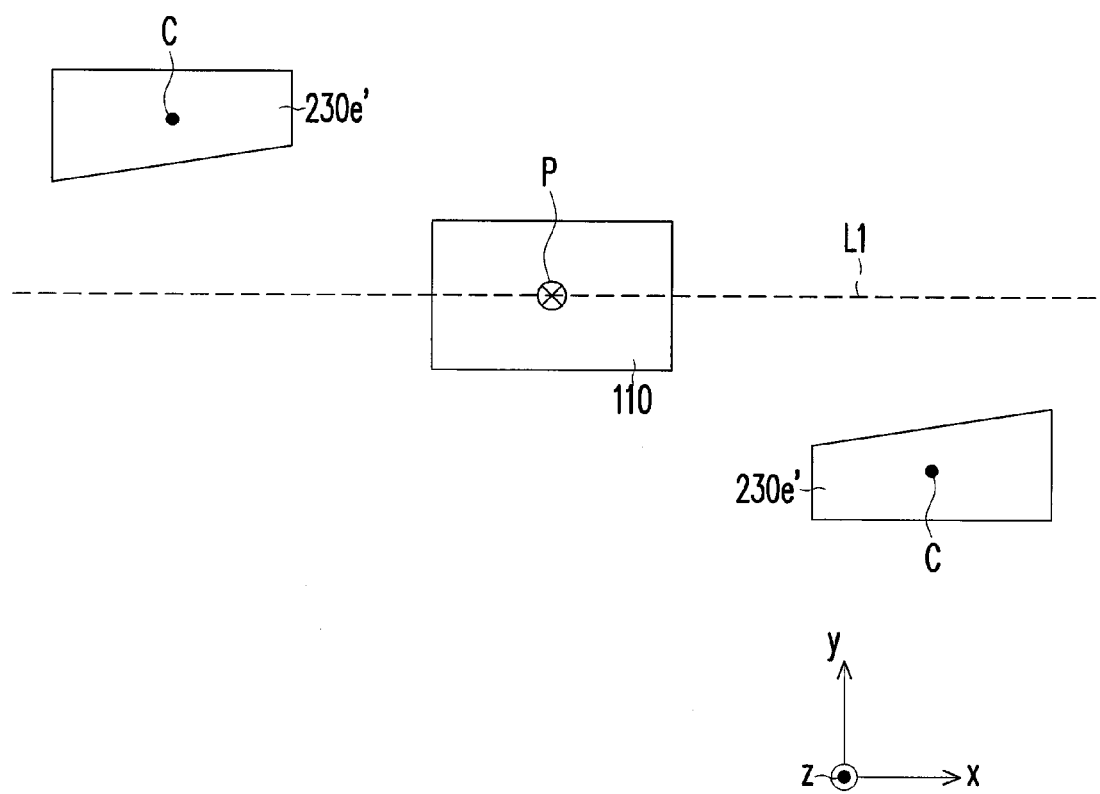
FIG. 8 illustrates another modification of the projection apparatus of FIG. 5A.

FIG. 8 illustrates another modification of the projection apparatus of FIG. 5A. Referring to FIG. 8, in the embodiment, the image source 110 has a horizontal line L1 intersected with an optical axis P of the image source 110. The optical axis P of the image source 110 and the horizontal line L1 are on a reference plane (that is, a plane including both the horizontal line L1 and the optical axis P, namely, a plane including the horizontal line L1 and perpendicular to the figure), and geometric centers C of the second reflectors 230e' are located other than the reference plane. In the embodiment, the geometric centers C of the two second reflectors 230e' are respectively located at two opposite sides of the reference plane. In comparison with the embodiment illustrated in FIG. 5A, the distance of geometric center C and the reference plane in the embodiment is further, and the horizontal of the images produced by the embodiment may be more well-balanced and unlikely to skew.

Figure 9:
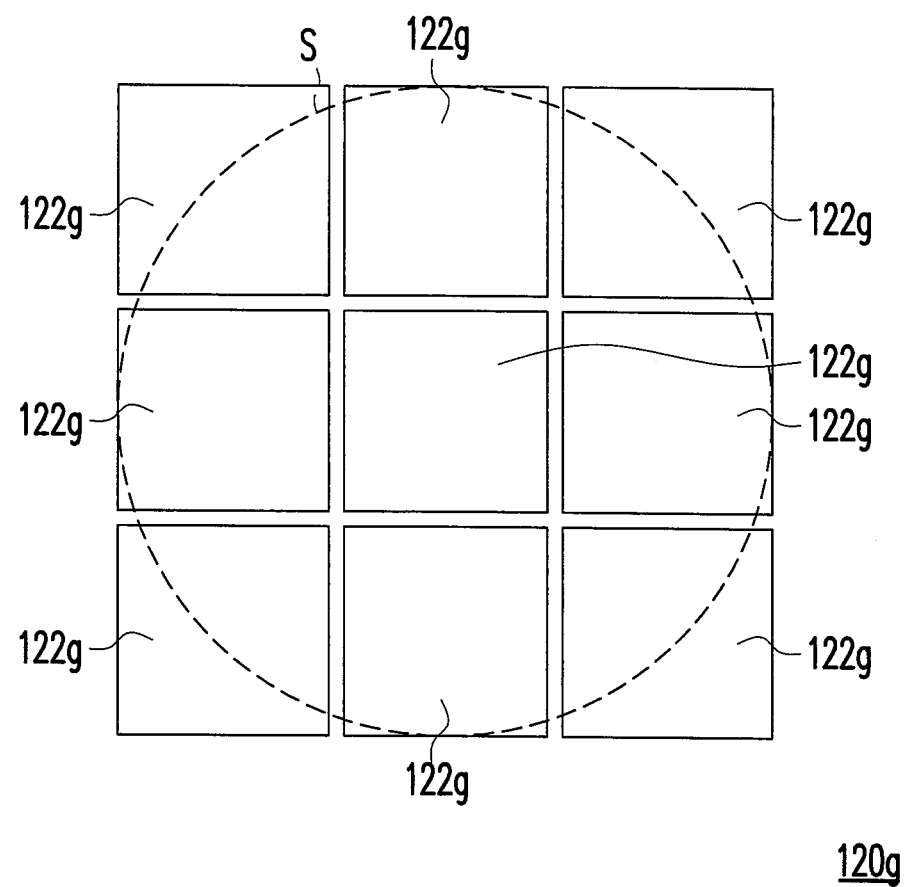
FIG. 9 is a front view of a beam splitting module according to another embodiment of the invention.

FIG. 9 is a front view of a beam splitting module according to another embodiment of the invention. Referring to FIG. 9, the beam splitting module of the embodiment is similar to the beam splitting module illustrated in FIG. 1B, and the difference between the two is described as follows. In the beam splitting module 120g of the embodiment, these aperture stop sub-regions 122g are arranged in a two-dimensional array. It is exemplified to be arranged in a 3×3 array in FIG. 9, and it may also be arranged in an M×N array in other embodiments.

When the amount of the aperture stop sub-regions 122g is nine, the projection apparatus is considered to set nine front lens groups correspondingly, so as to respectively project the nine image sub-beams from the nine aperture stop sub-regions 122g onto nine different regions of the imaging surface to form a blending frame. Similarly, when the amount of the aperture stop sub-regions 122g is M×N, the projection apparatus may also set M×N front lens groups correspondingly.

Each of the first reflectors, the second reflectors 230, 230e, 230f, 230e', the third reflectors 240f, and any other reflectors mentioned above may be a reflective mirror, a reflective film on a prism, a total reflective surface on a prism or other appropriate reflectors.

According to the above description, the projection apparatus of the embodiments of the invention may achieve at least one of the following advantages: in the projection apparatus of the embodiments of the invention, the beam splitting module is disposed on or near the aperture stop, and the aperture stop sub-regions separate the image sub-beams illuminating thereon. Therefore, these image sub-beams may be projected on different locations of the imaging surface to form a plurality of frames. Consequently, it is able to produce a blending frame composed of a plurality of frames by the projection apparatus. Hence, the projection apparatus of the embodiments of the invention may produce the blending image frames with lower costs.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus, comprising:
   an image source providing an image beam;
   an imaging module disposed on a transmission path of the image beam and having an aperture stop; and
   a beam splitting module disposed on the transmission path of the image beam and located on or near the aperture stop, the beam splitting module comprising a plurality of aperture stop sub-regions, and the beam splitting module separates a plurality of image sub-beams of the image beam respectively irradiating the different aperture stop sub-regions, wherein the image sub-beams respectively propagate towards different directions after travelling to the aperture stop sub-regions.

2. The projection apparatus as claimed in claim 1, wherein the beam splitting module comprises a plurality of first reflectors respectively forming the aperture stop sub-regions and respectively reflecting the image sub-beams in different directions.

3. The projection apparatus as claimed in claim 1, wherein one of the aperture stop sub-regions is a light transmissive region, another one of the aperture stop sub-regions is a reflective region, and the image sub-beams respectively propagate in different directions after travelling to the light transmissive region and the reflective region.

4. The projection apparatus as claimed in claim 3, wherein the beam splitting module comprises at least one first reflector for forming the reflective region.

5. The projection apparatus as claimed in claim 3, wherein the image sub-beam passing through the light transmissive region travels to a first region of an imaging surface, the image sub-beam reflected by the reflective region travels to a second region of the imaging surface, and the first region is different from the second region.

6. The projection apparatus as claimed in claim 5, wherein the imaging module further comprises at least one second reflector, and the second reflector is disposed on a transmission path of the image sub-beam reflected by the reflective region to reflect the image sub-beam reflected by the reflective region to the second region.

7. The projection apparatus as claimed in claim 6, wherein the image source has a horizontal line intersected with an optical axis of the image source, the horizontal line and the optical axis of the image source are on a reference plane and a geometric center of the second reflector is located other than the reference plane.

8. The projection apparatus as claimed in claim 6, wherein the imaging module further comprises at least one third reflector disposed on a transmission path of the image sub-beam reflected by the second reflector to reflect the image sub-beam reflected by the second reflector to the second region.

9. The projection apparatus as claimed in claim 1, wherein the imaging module comprises:
   a rear lens group disposed on the transmission path of the image beam and located between the image source and the aperture stop;
   a plurality of front lens groups respectively disposed on the transmission paths of the image sub-beams.

10. The projection apparatus as claimed in claim 1, wherein the imaging module projects the image sub-beams on different regions of an imaging surface.

11. The projection apparatus as claimed in claim 10, wherein the image sub-beams respectively form a plurality of images on the imaging surface, and the images are adjacent to each other.

12. The projection apparatus as claimed in claim 11, wherein each of the images has an edge, the images respectively have a plurality of first contents on a first reference line substantially parallel to the edges, and the first contents are respectively from a plurality of second contents of the image source on a plurality of second reference lines.

13. The projection apparatus as claimed in claim 12, wherein the second reference lines are substantially parallel to each other but do not coincide with each other.

14. The projection apparatus as claimed in claim 12, further comprising a screen being disposed on the imaging surface, wherein parts of the images on the screen are respectively from different regions of the image source.

15. The projection apparatus as claimed in claim 1, wherein the image source is a digital micro-mirror device, a liquid-crystal-on-silicon panel or a transmissive liquid crystal panel.

16. The projection apparatus as claimed in claim 1, further comprising an illumination system providing an illumination beam, wherein the image source is a light valve, and the light valve is disposed on a transmission path of the illumination beam to convert the illumination beam into the image beam.

17. The projection apparatus as claimed in claim 1, wherein the aperture stop sub-regions are arranged along a reference line.

18. The projection apparatus as claimed in claim 1, wherein the aperture stop sub-regions are arranged in a two-dimensional array.

* * * * *